(12) United States Patent
Dykstra et al.

(10) Patent No.: US 7,484,409 B2
(45) Date of Patent: Feb. 3, 2009

(54) FLUID LEVEL SWITCH

(75) Inventors: Richard A. Dykstra, Cedar Grove, WI (US); Gary Gracyalny, Elm Grove, WI (US); David Procknow, Elm Grove, WI (US); John Garthwaite, Sussex, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 352 days.

(21) Appl. No.: 11/391,591

(22) Filed: Mar. 28, 2006

(65) Prior Publication Data

US 2007/0227244 A1    Oct. 4, 2007

(51) Int. Cl.
G01F 23/56 (2006.01)
G01F 23/68 (2006.01)

(52) U.S. Cl. .............. 73/319; 73/305; 73/307; 73/313; 73/322.5

(58) Field of Classification Search ........... 73/290 R, 73/305–322.5
See application file for complete search history.

(56) References Cited

U.S. PATENT DOCUMENTS

| | | | | |
|---|---|---|---|---|
| 1,326,578 A * | 12/1919 | Curtis | ............ | 200/84 R |
| 1,768,446 A | 6/1930 | Gron | | |
| 2,915,605 A | 12/1959 | Friedell | | |
| 3,896,281 A | 7/1975 | Feoktistov et al. | | |
| 4,473,730 A * | 9/1984 | Ida | ............ | 200/84 R |
| 4,591,837 A | 5/1986 | Martinez | | |
| 4,771,272 A * | 9/1988 | Barnes | ............ | 340/624 |
| 5,026,954 A * | 6/1991 | Cebulski | ............ | 200/84 C |
| 5,151,685 A * | 9/1992 | Spicer et al. | ............ | 340/605 |
| 5,807,145 A | 9/1998 | Deylitz | | |
| 6,513,378 B1 * | 2/2003 | Love, Jr. | ............ | 73/313 |
| 6,730,865 B1 * | 5/2004 | Hernandez-Zelaya | ..... | 200/84 R |
| 7,017,780 B2 * | 3/2006 | Renaud | ............ | 221/263 |
| 7,077,003 B2 * | 7/2006 | Tsuruoka et al. | ............ | 73/313 |
| 7,315,250 B1 * | 1/2008 | Hernandez-Zelaya | ....... | 340/624 |
| 7,414,209 B2 * | 8/2008 | Tsuruoka et al. | ............ | 200/84 R |

FOREIGN PATENT DOCUMENTS

| | | |
|---|---|---|
| DE | 1821034 U | 11/1960 |
| DE | 2642215 A1 | 3/1978 |
| DE | 3509606 A1 | 9/1986 |
| EP | 1174895 A | 1/2002 |
| FR | 2493557 A | 5/1982 |
| JP | 06186073 A * | 7/1994 |
| JP | 7317525 | 5/1995 |

* cited by examiner

Primary Examiner—David A. Rogers
(74) Attorney, Agent, or Firm—Michael Best & Friedrich LLP

(57) ABSTRACT

A fluid level switch for a machine having a fluid reservoir adapted to contain a fluid at an acceptable level. The fluid level switch includes a mounting plate, a float housing, and a float assembly positioned within the float housing. The mounting plate retains first and second contacts. The float housing is configured to receive fluid from the fluid reservoir and the float assembly is movable in response to the level of fluid in the float housing. The float assembly includes a contact member electrically connecting the first and second contacts when the level of the fluid is below the acceptable level. The contact member is coupled to the float for movement with the float and for movement relative to the float.

48 Claims, 5 Drawing Sheets

FLUID LEVEL SWITCH

BACKGROUND

The present invention relates to fluid level sensors, and more specifically to low oil sensors for engines.

Fluid level sensors are generally used to determine the level of fluid retained within an enclosure. Some fluid level sensors activate an indicator when the fluid level decreases below a desired fluid level while others automatically shut off the system using the fluid.

In operation, fluid level sensors are positioned directly in a fluid reservoir, or within a smaller enclosure in fluid communication with the fluid reservoir. The enclosure maintains a fluid level proportional to the amount of fluid in the reservoir. One example of an application of a fluid level sensor is a sensor for the oil level within the crankcase of an internal combustion engine. The engine requires a desired amount of oil within the crankcase to properly lubricate the engine during operation. If the oil level is too low, the engine can be damaged due to improper lubrication. A fluid level sensor can be used to determine when the oil level within the crankcase is below a desired level.

Prior art systems often employ the use of a float within a housing to move with the level of fluid as the level of fluid changes. A sensor or an electrical contact can be positioned in the vicinity of the float and can be used to detect when the level of fluid is not within a desired range. The sensor or contact can communicate the condition of the fluid level through a indicator such as a warning light or by automatically shutting off the device that is using the fluid to operate. For example, the float can complete an electrical connection between a ground and an ignition contact to shut off the engine when the float is in a position indicative of low fluid or complete an electrical circuit for an audible indicator or visual indicator.

The use of such a system is generally reliable in shutting off the engine when a low amount of fluid is present. However, signaling a low fluid condition can be inconsistent due to the effect of the vibrations caused by moving parts of the engine, for example. This causes the fluid to move and splash around in the reservoir, thereby causing movement of the float and an unstable contact between the ground and ignition contact. This movement has the potential to prevent the float from grounding the ignition long enough to completely shut down the engine.

SUMMARY

In some embodiments, the present invention is directed to a low fluid sensor that can be mounted to an engine or other machine to accurately detect a condition of low fluid. The apparatus can include a float contact that compensates for the movement of a float due to splashing of fluid in a reservoir for a system that has moving parts.

Using a float contact that is movable relative to the float allows the low fluid sensor to more accurately determine a low fluid condition and limit the incidence of intermittent grounding of the ignition. A movable float contact allows for tolerance or dimensional variations of the contacts. In the case that the contacts are not exactly the same size or height, the moveable plate is still capable of touching all of the contacts simultaneously. Additionally, a movable float contact can remain in contact with the ground and ignition contact even while the float is moving in response to vibrations, because the float contact is weighted and loosely coupled to the float so that the float contact does not move with every slight dip and peak of the float. Instead, the plate will continue to contact the electrical contacts and therefore allow the low fluid indicator to remain in a "shut-off" state until more fluid is added to the system.

One embodiment of the present invention is directed to a fluid level switch for a machine having a fluid reservoir adapted to contain a fluid at an acceptable level. The fluid level switch includes a mounting plate, a float housing, and a float assembly positioned within the float housing. The mounting plate retains first and second contacts. The float housing is configured to receive fluid from the fluid reservoir and the float assembly is movable in response to the level of fluid in the float housing. The float assembly includes a contact member electrically connecting the contacts when the level of the fluid is below the acceptable level. The contact member is coupled to the float for movement with the float and for movement relative to the float.

Another embodiment of the invention is directed to a fluid level switch for a machine having a fluid reservoir adapted to contain a fluid at an acceptable level. The fluid level switch includes first and second contacts, and a float assembly adapted to be in fluid communication with the fluid reservoir. The float assembly includes a float and a contact member. The float is movable between a raised position when the fluid is at an acceptable level and a lowered position when the fluid is below the acceptable level. The contact member is coupled to the float about at least a portion of the periphery of the contact member. The contact member electrically connects the first and second contacts when the fluid is below the acceptable level.

Another embodiment of the invention is directed to a fluid level switch for a machine having a fluid reservoir adapted to contain a fluid at an acceptable level. The fluid level switch includes a float housing, first and second contacts, and a float assembly. The float housing is configured to receive fluid from the fluid reservoir, and the first and second contacts are positioned on a same side of the float housing. The float assembly is positioned within the float housing and includes a float and a contact member. The float is movable between a raised position when the fluid is at an acceptable level and a lowered position when the fluid is below the acceptable level. The contact member is coupled to the float for movement with the float between raised and lowered positions and for movement relative to the float. The contact member electrically connects the first and second contacts in at least one of the raised and lowered condition.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
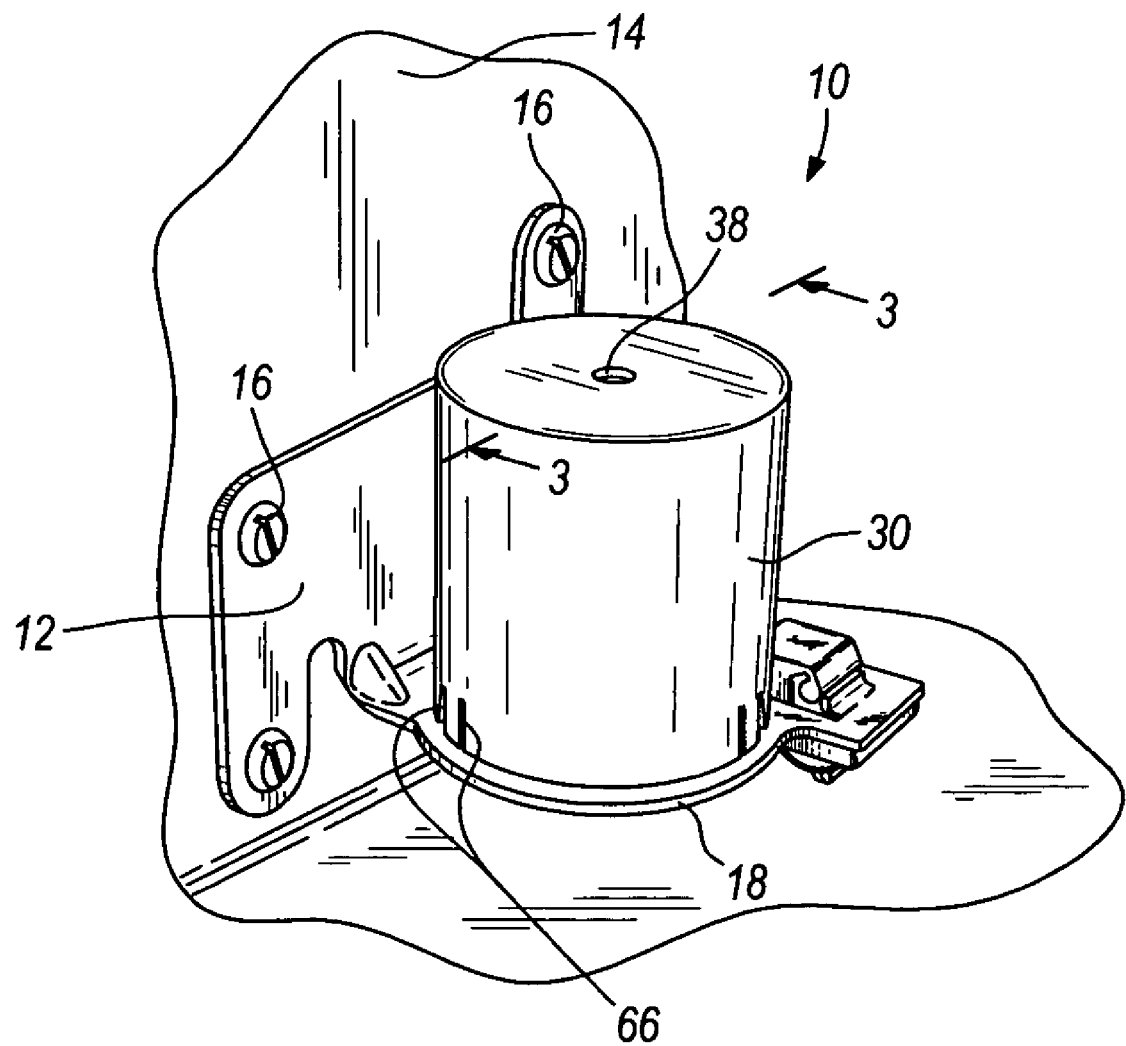
FIG. 1 is a perspective view of a fluid level switch according to a first embodiment of the present invention.
Figure 2:
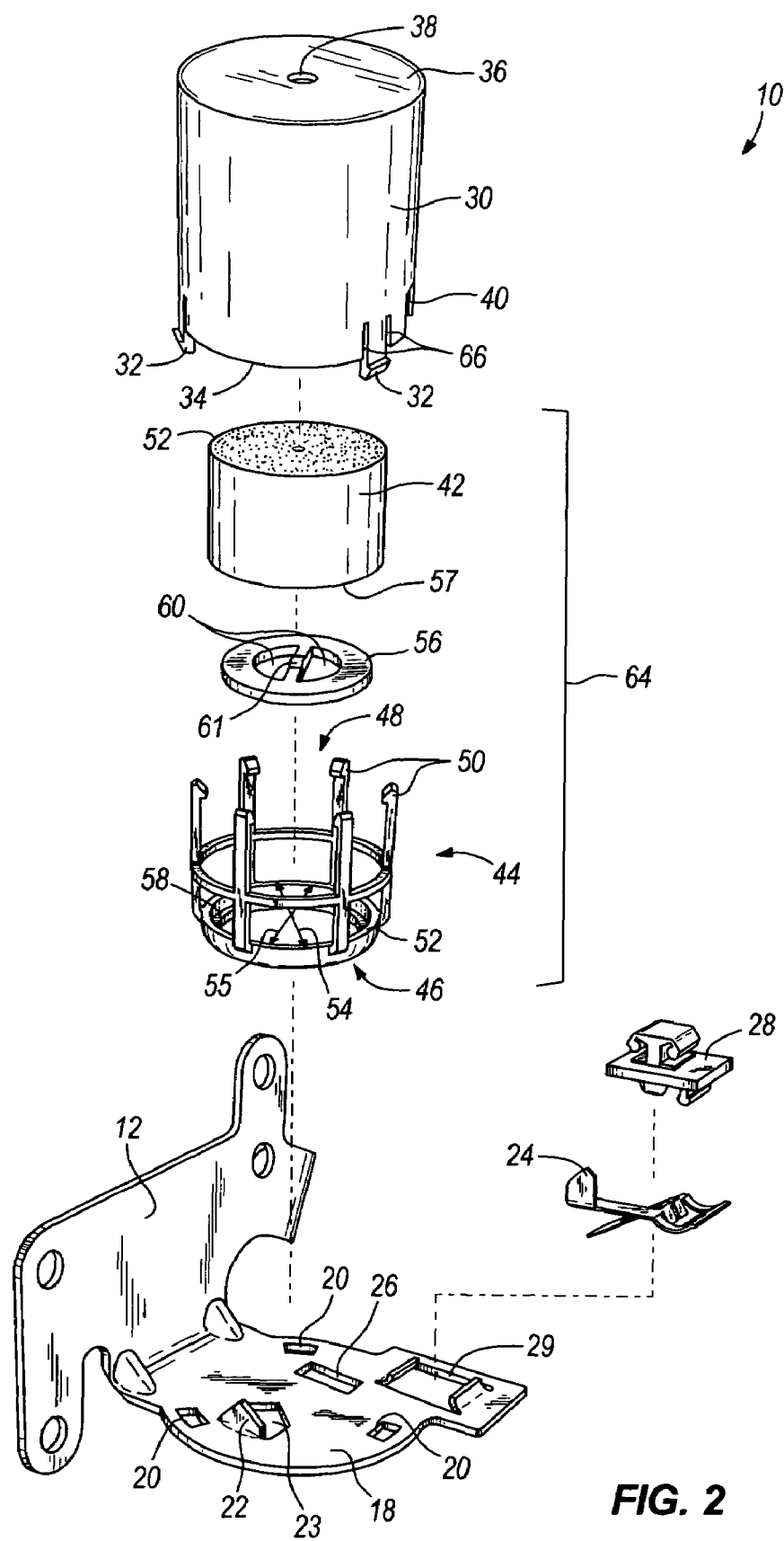
FIG. 2 is an exploded view of the fluid level switch of FIG. 1.

A fluid level switch 10 of a first embodiment of the present invention is illustrated in FIG. 1. The fluid level switch 10 includes a mounting plate 12 fastened to a vertical wall 14 of an engine by mounting screws 16. Any conventional fastener can be employed to secure the mounting plate 12 to the vertical wall 14 as just described, such as screws, nails, rivets, pins, posts, clips, clamps, inter-engaging elements, and any combination of such fasteners. The mounting plate 12 is L-shaped to include a support portion 18. As shown in FIG. 2, the support portion 18 includes three apertures 20, however, the number of apertures 20 can vary.

As better illustrated in FIG. 2, the support portion 18 comprises two electrical contacts 22, 24. The first electrical contact, such as a ground contact 22, is made from a piece of the support portion 18 that has been bent upwardly a distance from the surface of the support portion 18, thereby forming an aperture 23. The second electrical contact is an ignition contact 24 that is made up of a conductive material and that extends through an aperture 26 in the support portion 18. Although the second contact of the illustrated embodiment is described as being an ignition contact, the second contact in other embodiments can alternatively be any live or hot contact not necessarily electrically connected to the ignition. In the illustrated embodiment, an insulator 28 supports the ignition contact 24 and is press-fit into an aperture 29 of the support portion 18. However, the insulator 28 can be coupled to the support portion 18 in various ways such as the use of fasteners or molding. The insulator 28 acts to prevent electrical contact between the ground contact 22 and the ignition contact 24.

The fluid level switch 10 also includes a cylindrical float housing 30 with protrusions 32 that line up with the apertures 20 for coupling the float housing 30 to the support portion 18. The float housing 30 has an open end 34 where the protrusions 32 are located and a closed end 36 having a centrally located aperture 38. In other embodiments, the aperture 38 could be located anywhere on the closed end to vent for air. A gap or cutout 40 in the float housing 30 provides clearance for the insulator 28 when the float housing 30 is coupled to the support portion 18 and allows for a snap-fit assembly. The insulator 28 is partially located within the float housing 30 to reduce the size of the fluid level switch 10. The location of the insulator 28 can vary and is not limited to the placement shown in FIG. 2. Specifically, the insulator 28 does not have to be located partially within the float housing 30.

Figure 3:
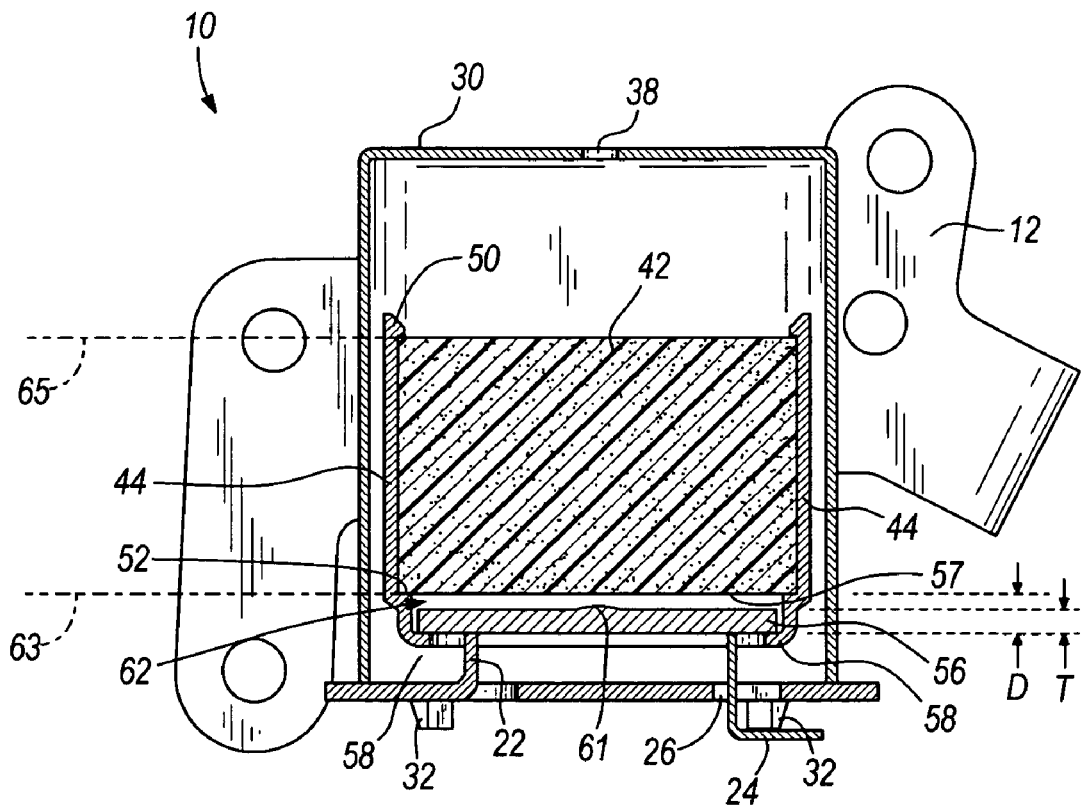
FIG. 3 is cross-sectional view taken along line 3-3 of FIG. 1.

A cylindrical float 42 made of a buoyant material is shown in FIGS. 2 and 3. The float 42 is held in a retaining member 44 having a cage structure. Both a bottom portion 46 and a top portion 48 of the retaining member 44 are open. The retaining member 44 has a plurality of tabs 50 on the top portion 48 that can retain the float 42 within the retaining member 44. The float 42 rests on a first lip 52 that includes an outer diameter 54 equal to the upper portion 48 of the retaining member 44 and an inner diameter 55 smaller than that of the float 42. The first lip 52 thereby supports the bottom 57 of the float 42. A plate 56 can be positioned between the float 42 and the bottom portion 46 of the retaining member 44. The plate 56 sits on a second lip 58 on the bottom portion 46 of the retaining member 44. The second lip 58 is spaced from the first lip 52 a distance D to allow movement of the plate 56 (having a thickness T) relative to the float 42 within the retaining member 44. The plate 56 is disc-shaped and has apertures 60 for weight adjustment. A centrally located, raised portion 61 of the plate 56 helps to prevent the plate 56 from becoming stuck to the float 42 due to viscous properties of the fluid. The raised portion allows only a small portion of the plate 56 to contact the float 42. The plate 56, also referred to as a contact plate, is not limited to the illustrated shape, but can take on a plurality of shapes and sizes such that it can provide electrical communication between two contacts. It is preferable that the plate 56 be more dense than the fluid, however it is not required. In the preferred embodiment, gravity pulls the plate 56 down on the contacts 22, 24.

FIG. 3 illustrates the internal structure of the fluid level switch 10. The plate 56 rests upon the second lip 58 of the retaining member 44. Between the top of the plate 56 and the bottom 57 of the float 42 is a space 62. The space 62 allows linear and angular motion of the plate 56 to help improve switching characteristics. The bottom 57 of the float 42 rests upon the first lip 52 of the retaining member 44, and is held at the top portion 58 of the retaining member 44 by the tabs 50. In combination, the float 42, plate 56, and retaining member 44 define a float assembly 64 (FIG. 2). The float assembly 64 fits within the cylindrical float housing 30. As shown in FIGS. 1 and 2, the protrusions 32 of the float housing 30 engage the apertures 20 to cover contacts 22, 24. The gap 40 in the float housing 30 prevents interference from the insulator 28 when the float housing 30 is coupled to the support portion 18.

A first side of the float housing 30 is defined below the float 42, and everything located below reference line 63 is considered to be below the float 42. A second side of the float housing 30 is defined above the float 42, and everything located above reference line 65 is considered to be above the float 42. As illustrated in FIG. 3, both contacts 22, 24 are below the float 42 and on the first side of the housing 30.

One embodiment of the present invention can be located in the crankcase of an engine. The crankcase is a relatively turbulent environment and the level of fluid, such as oil, may fluctuate greatly depending on a number of factors, such as slight tilting or changes to the orientation of the engine and the crankshaft or other moving parts splashing the oil. Other embodiments could be used on pumps, transmissions, or any other machine with moving parts and a fluid reservoir.

As illustrated in FIGS. 1 and 2, the fluid level switch 10 allows oil to flow into and out of the float housing 30 through the apertures 23, 26, 38. The protrusions 32 of the float housing 30 may have apertures 66 as well to allow for fluid flow into the float housing 30. Since the float 42 is made of a buoyant material, the float 42 will cause the float assembly 64 to rise and fall with the oil level. When oil is added to the engine, the float assembly 64 will rise with the level of the oil. As oil is used in the system, the float assembly 64 will lower with the oil level.

Figure 4:
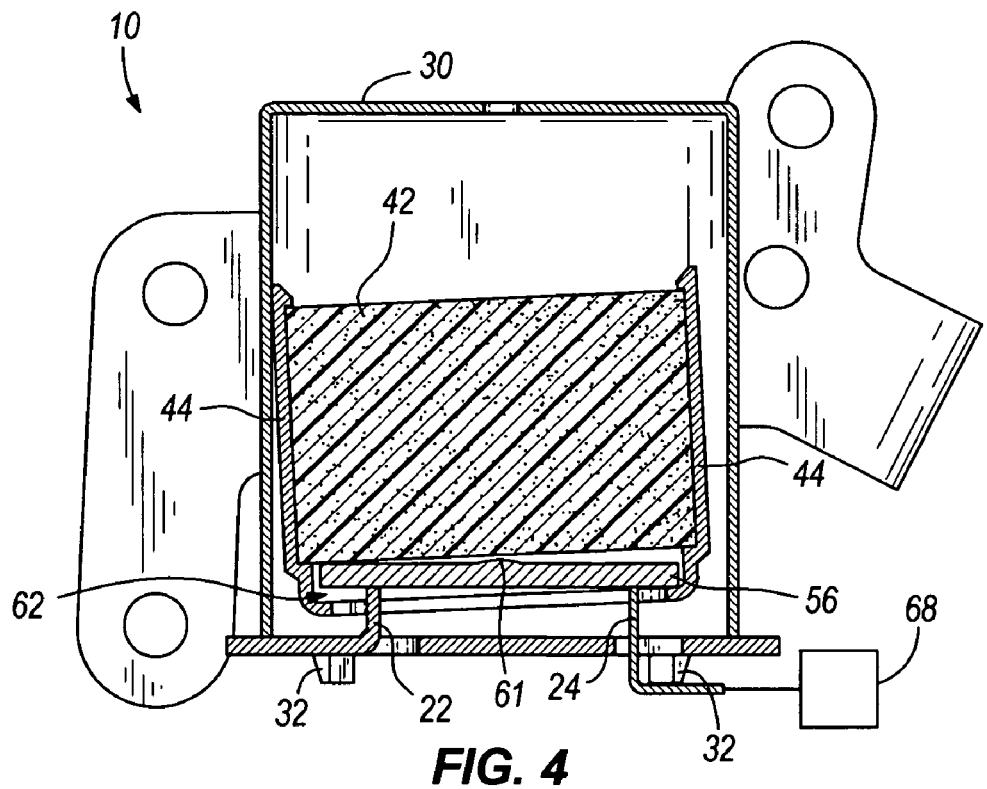
FIG. 4 is a view similar to FIG. 3 illustrating a float in a tilted condition.

As the level of oil nears an undesired low level, the float assembly 64 and hence the plate 56 move increasingly closer to the contacts 22, 24, as shown in FIG. 3. When the oil reaches a predetermined level that would be considered a "low oil" condition, the plate 56 touches the contacts 22, 24. Because the plate 56 is more dense than the fluid being monitored, the plate 56 will tend to stay in relatively the same position although the plate 56, in most situations, is submerged in fluid. As shown in FIG. 4, the space 62 between the plate 56 and the float 42 is intended to be large enough to allow the plate 56 to remain in contact with electrical contacts 22, 24 even while the float 42 and retaining member 44 move and tilt inside the cylindrical float housing 30 caused by misaligned contacts 22, 24 or agitated fluid from normal engine vibration or operation.

The illustrated embodiment uses an "engine shutdown" method by grounding the primary ignition current when the plate 56 is touching both contacts 22, 24. For example, the operator of a lawnmower or snow blower can be alerted of such a situation through the engine being shut-off during operation. Upon the operator adding enough oil to the system whereby the plate is not touching either electrical contact 22, 24, the engine can be restarted and regular operation can resume.

An alternate design for the fluid level switch 10 uses an "indicator method" to alert an operator of the low oil situation. When the plate 56 touches both contacts 22, 24, an electrical circuit can be completed to alert the operator of a low oil situation through an indicator such as a "low oil" light or a "low oil" alarm or buzzer. When the "low oil" indicator is activated, the operator knows that a low oil situation is occurring. In that case, the operator can choose to continue operating the machine while in a state of low oil and risk damaging the engine, or can add oil until the plate 56 is no longer touching the contacts 22, 24.

In the engine shutdown method, a latching module 68 (illustrated in FIG. 4) can be used to prevent intermittent or false shutdown due to switch bouncing caused by engine vibration and turbulence of the fluid surrounding the float assembly 64. False shutdown occurs when vibration and turbulence of the engine and fluid do not allow the float to ground the ignition long enough to completely shut down the engine. The latching module 68 operates to ground the ignition even after the plate 56 bounces out of contact with the first and second contacts 22, 24. In one embodiment, the latching module 68 includes a capacitor and a silicon controlled rectifier ("SCR") electrically connected to the capacitor. When the plate 56 electrically connects the first and second contacts (i.e., when the fuel level switch closes), the ignition pulse from the engine's ignition system charges the capacitor. When the charge of the capacitor reaches a voltage value that is sufficiently high to switch the SCR "on", the primary winding current is shunted through the SCR to ground, thereby shutting down the engine. The SCR remains "on", using the energy stored in the capacitor as the engine rotates during coastdown. As long as the SCR is "on", the primary winding current will remain shunted through the SCR regardless of whether the fluid level switch re-opens due to vibrations.

Figure 5:
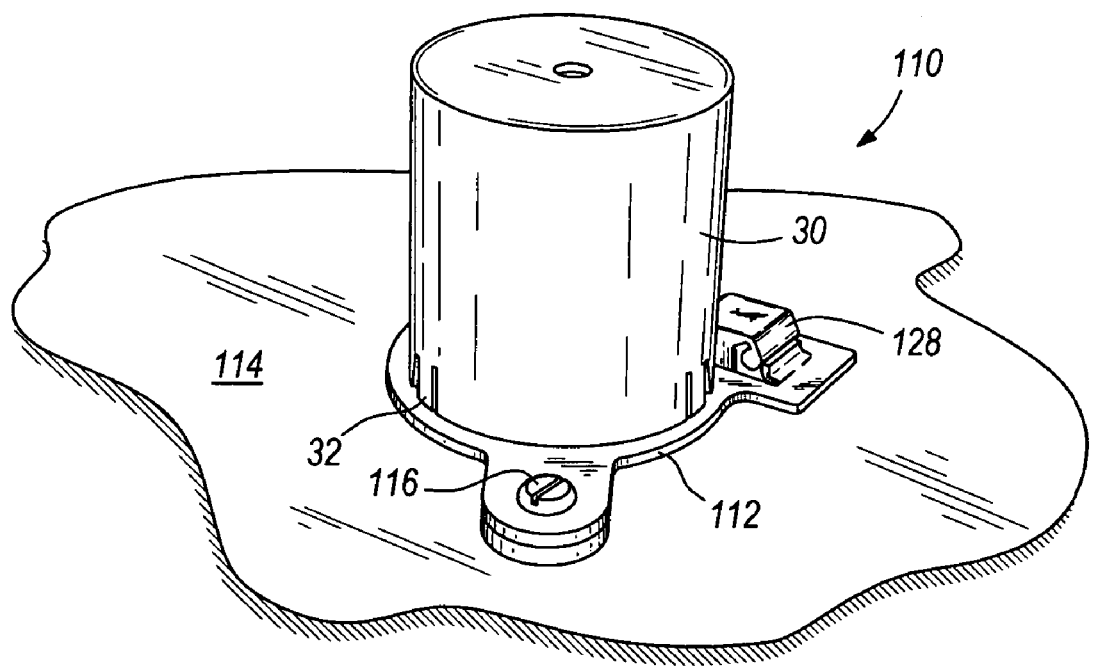
FIG. 5 is a perspective view of a fluid level switch according to another embodiment of the present invention.

A fluid level switch 110 according to an alternate embodiment of the present invention is illustrated in FIG. 5. The fluid level switch 110 is adapted for mounting to a horizontal surface 114 using mounting fasteners 116. A mounting plate 112 can be fastened to the horizontal surface 114 in the same manner that the first embodiment of the mounting plate 12 can be fastened to a vertical surface 14. Mounting plate 112 is similar to the support portion 18 as shown in FIG. 1 and the fluid level switch 110 operates similar to fluid level switch 10.

Figure 6:
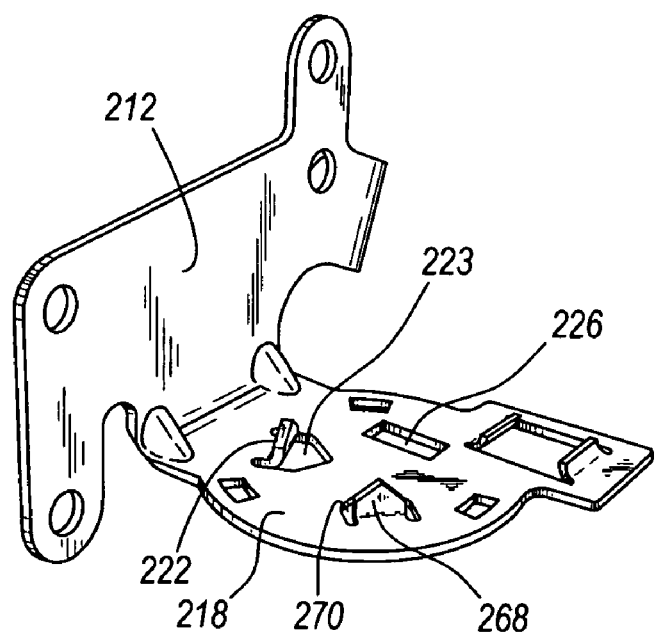
FIG. 6 is a perspective view of a mounting plate according to another embodiment of the present invention.

Another embodiment of a mounting plate 212 is illustrated in FIG. 6. The mounting plate 212 is adapted to be fastened to a vertical surface 14 similar to the mounting plate 12 illustrated in FIG. 1. The mounting plate 212 has a support portion 218 that comprises three electrical contacts 222, 268, 24 (shown in FIG. 2). The electrical contacts, such as ground contacts 222, 268, are made from pieces of the support portion 218 that have been bent upwardly a distance from the surface of the support portion 218 thereby forming apertures 223, 270. The electrical contact 24 is made of conductive material and extends through an aperture 226 in the support portion 218. The mounting plate 212 used with the float assembly 64 is similar to the mounting plates 12, 112 illustrated in FIGS. 1-5. In other embodiments, the mounting plate 212 can be reconfigured to be fastened to a horizontal surface 114 similar to the mounting plate 112 illustrated in FIG. 5.

Figure 7:
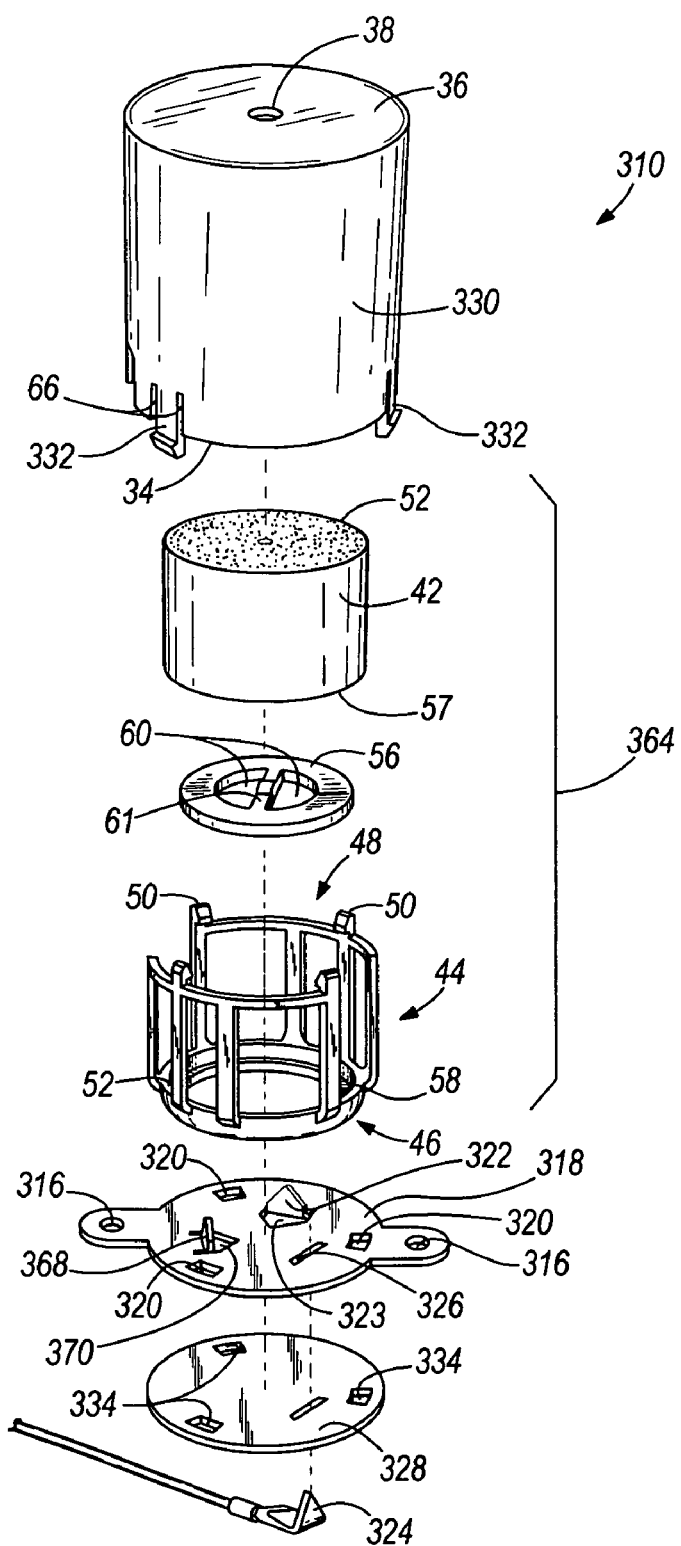
FIG. 7 is an exploded view of a fluid level switch according to another embodiment of the present invention.

A fluid level switch 310 of another embodiment of the present invention is illustrated in FIG. 7. The fluid level switch 310 includes a mounting plate 312 that can fastened to a wall of an engine by inserting fasteners through apertures 316. The mounting plate 312 includes a support portion 318 that has two electrical contacts 322, 368. The electrical contacts 322, 368 can be ground contacts and are made from pieces of the support portion 318 that have been bent upwardly a distance from the surface of the support portion 318 thereby forming apertures 323, 370.

The fluid level switch 310 also includes an electrical contact 324 that extends through an aperture 326 in the support portion 318. The electrical contact 324 can be an ignition contact and is made from a conductive material. The ignition contact extends through the aperture 326 in the support portion 318 such that the ignition contact does not contact the mounting plate 312.

In the illustrated embodiment, a shield 328 supports the ignition contact 324 and is coupled to the mounting plate 312 by the protrusions 332 of the float housing 330. Specifically, the protrusions 332 of the float housing 330 extend through the apertures 320 of the mounting plate 312 and into apertures 334 of the shield 328 to couple the mounting plate 312 between the float housing 330 and the shield 328. The shield 328 reduces the effect of oil turbulence within the oil reservoir on the operation of the fuel level switch 310. Specifically, the shield 328 resists the flow of oil through apertures 323, 370 making the operation of the plate 56 and float 42 less affected by the turbulence outside the float housing 330. The shield 328 is made of an insulating material. In addition, the shield 328 replaces the insulator 28, 128 of the previous embodiments (FIGS. 1-6) to support the ignition contact 324 and to prevent electrical contact between the ignition contact 324 and the ground contacts 322, 368 and between the ignition contact 324 and the mounting plate 312.

The fluid level switch 310 also includes a float assembly 364 similar to the float assembly 64 of the first embodiment as illustrated in FIG. 2 except that the protrusions 332 of the float housing 330 are slightly extended to capture the shield 328. The reference numbers used to describe the float assembly 64 of FIG. 2 are used to describe the corresponding components of the float assembly 364 in FIG. 7.

The constructions and aspects described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the claims.

What is claimed is:

1. A fluid level switch for a machine having a fluid reservoir adapted to contain a fluid at an acceptable level, the fluid level switch comprising:
 a mounting plate retaining first and second contacts;
 a float housing configured to receive fluid from the fluid reservoir; and
 a float assembly positioned within the float housing and movable in response to the level of fluid in the float housing, the float assembly including;
 a retaining member;
 a float retained within the retaining member; and
 a contact member disposed within the retaining member and movable relative to the float within the retaining member, the contact member electrically connecting the first and second contacts when the level of the fluid is below the acceptable level, the contact member coupled to the float for movement with the float and for movement relative to the float.

2. The fluid level switch of claim 1, wherein the mounting plate is adapted to be mounted to a vertical wall of the fluid reservoir.

3. The fluid level switch of claim 1, wherein the mounting plate is adapted to be mounted to a horizontal wall of the fluid reservoir.

4. The fluid level switch of claim 1, wherein the float housing has at least one aperture to allow fluid to flow between the float housing and the reservoir.

5. The fluid level switch of claim 1, wherein the first contact is integrally formed with the mounting plate.

6. The fluid level switch of claim 1, wherein the second contact is supported on the mounting plate by an insulator, wherein the insulator is configured to be press-fit into an aperture in the mounting plate.

7. The fluid level switch of claim 1, wherein the electrical connection between the first and second contacts activates at least one of an audible indicator and a visual indicator.

8. The fluid level switch of claim 1, wherein the contact member is a plate with a raised center portion.

9. The fluid level switch of claim 1, wherein at least one of the first and second contacts is electrically connected to a latching module.

10. The fluid level switch of claim 1, wherein the second contact is supported on the mounting plate by a shield.

11. The fluid level switch of claim 6, wherein the shield is made of an insulating material.

12. The fluid level switch of claim 1, wherein the second contact is coupled to the mounting plate through an insulator, the insulator at least partially raised above the surface of the mounting plate.

13. The fluid level switch of claim 12, wherein the float housing has a cutout to allow for the raised portion of the insulator to fit partially within the cutout.

14. The fluid level switch of claim 1, wherein the float housing is coupled to the mounting plate, and wherein the float housing is snap-fit to the mounting plate.

15. The fluid level switch of claim 14, wherein the float housing includes biased tabs that fit within a corresponding number of apertures in the mounting plate.

16. The fluid level switch of claim 15, wherein the float housing is cylindrical and the biased tabs are located around the perimeter of one end of the float housing.

17. The fluid level switch of claim 1, wherein the machine is an engine having an ignition and wherein the second contact is electrically connected to the ignition.

18. The fluid level switch of claim 17, wherein the electrical connection between the first and second contacts grounds the ignition.

19. A fluid level switch for a machine having a fluid reservoir adapted to contain a fluid at an acceptable level, the fluid level switch comprising:
 a first contact;
 a second contact;
 a float assembly adapted to be in fluid communication with the fluid reservoir, the float assembly including:
 a retaining member;
 a float retained within the retaining member and movable between a raised position when the fluid is at an acceptable level and a lowered position when the fluid is below the acceptable level; and
 a contact member disposed within the retaining member and movable relative to the float within the retaining member, the contact member having a periphery, the contact member coupled to the float about at least a portion of the periphery, the contact member electrically connecting the first and second contacts when the fluid is below the acceptable level.

20. The fluid level switch of claim 19, wherein the contact member is more dense than that of the fluid in the machine.

21. The fluid level switch of claim 19, wherein the outer diameter of the float is greater than that of the outer diameter of the contact member.

22. The fluid level switch of claim 19, wherein the contact member is a plate.

23. The fluid level switch of claim 19, wherein the contact member includes a centrally-located raised portion.

24. The fluid level switch of claim 19, wherein the electrical connection between the first and second contacts activates at least one of an audible indicator and a visual indicator.

25. The fluid level switch of claim 19, further comprising a float housing configured to receive fluid from the fluid reservoir, and wherein the float assembly is positioned within the float housing.

26. The fluid level switch of claim 19, wherein the contact member is coupled to the float for movement with the float between the raised and lowered positions and for movement relative to the float.

27. The fluid level switch of claim 19, wherein at least one of the first and second contacts is electrically connected to a latching module.

28. The fluid level switch of claim 19, wherein the machine is an engine having an ignition and wherein the second contact is electrically connected to the ignition.

29. The fluid level switch of claim 28, wherein the electrical connection between the first and second contacts grounds the ignition.

30. The fluid level switch of claim 19 wherein the retaining member has a first lip supporting the contact member, and a second lip supporting the float.

31. The fluid level switch of claim 30, wherein the first lip is circular to support the periphery of the contact member.

32. The fluid level switch of claim 30, wherein the first lip and the second lip are separated by a distance, wherein the contact member includes a thickness, and wherein the distance separating the first lip and the second lip is greater than the thickness of the contact member.

33. A fluid level switch for a machine having a fluid reservoir adapted to contain a fluid at an acceptable level, the fluid level switch comprising:
 a float housing configured to receive fluid from the fluid reservoir;

first and second contacts positioned on a same side of the float housing; and a float assembly positioned within the float housing, the float assembly including:
  a retaining member;
  a float retained within the retaining member and movable between a raised position when the fluid is at an acceptable level and a lowered position when the fluid is below the acceptable level; and
  a contact member disposed within the retaining member and coupled to the float for movement with the float between raised and lowered positions and for movement relative to the float, the contact member electrically connecting the first and second contacts in at least one of the raised and lowered condition.

34. The fluid level switch of claim 33, wherein the contact member electrically connects the first and second contacts in the lowered position when the fluid is below the acceptable level.

35. The fluid level switch of claim 33, wherein the first and second contacts are positioned below the float.

36. The fluid level switch of claim 33, wherein at least one of the first and second contacts is electrically connected to a latching module.

37. The fluid level switch of claim 33, wherein the second contact is supported on the mounting plate by a shield.

38. The fluid level switch of claim 37, wherein the shield is made of an insulating material.

39. The fluid level switch of claim 33, wherein the contact member includes a periphery, the contact member coupled to the float about at least a portion of the periphery.

40. The fluid level switch of claim 39, wherein the contact member is a plate with a raised center portion.

41. The fluid level switch of claim 33, further comprising a mounting plate retaining the first and second contacts.

42. The fluid level switch of claim 41, wherein the first contact is integrally formed with the mounting plate.

43. The fluid level switch of claim 41, further comprising a shield disposed adjacent the mounting plate.

44. The fluid level switch of claim 41, wherein the second contact is supported on the mounting plate by an insulator, wherein the insulator is configured to be press-fit into an aperture in the mounting plate.

45. The fluid level switch of claim 33, wherein the retaining member includes a first lip supporting the contact member, and a second lip supporting the float.

46. The fluid level switch of claim 45, wherein the first lip is circular to support the periphery of the contact member.

47. The fluid level switch of claim 45, wherein the first lip and the second lip are separated by a distance, wherein the contact member includes a thickness, and wherein the distance separating the first lip and the second lip is greater than the thickness of the contact member.

48. A fluid level switch for a machine having a fluid reservoir adapted to contain a fluid at an acceptable level, the fluid level switch comprising:
  a mounting plate retaining first and second contacts;
  a float housing having protrusions and configured to receive fluid from the fluid reservoir;
  a float assembly positioned within the float housing and movable in response to the level of fluid in the float housing, the float assembly including a contact member electrically connecting the first and second contacts when the level of the fluid is below the acceptable level, the contact member coupled to the float for movement with the float and for movement relative to the float; and
  a shield having apertures and positioned adjacent to the mounting plate;
  wherein the protrusions extend through the mounting plate and are received within the apertures of the shield.

* * * * *